Oct. 13, 1936.　　　W. H. ENGEL　　　2,057,295
BAG MACHINE
Filed Oct. 20, 1932　　12 Sheets-Sheet 1
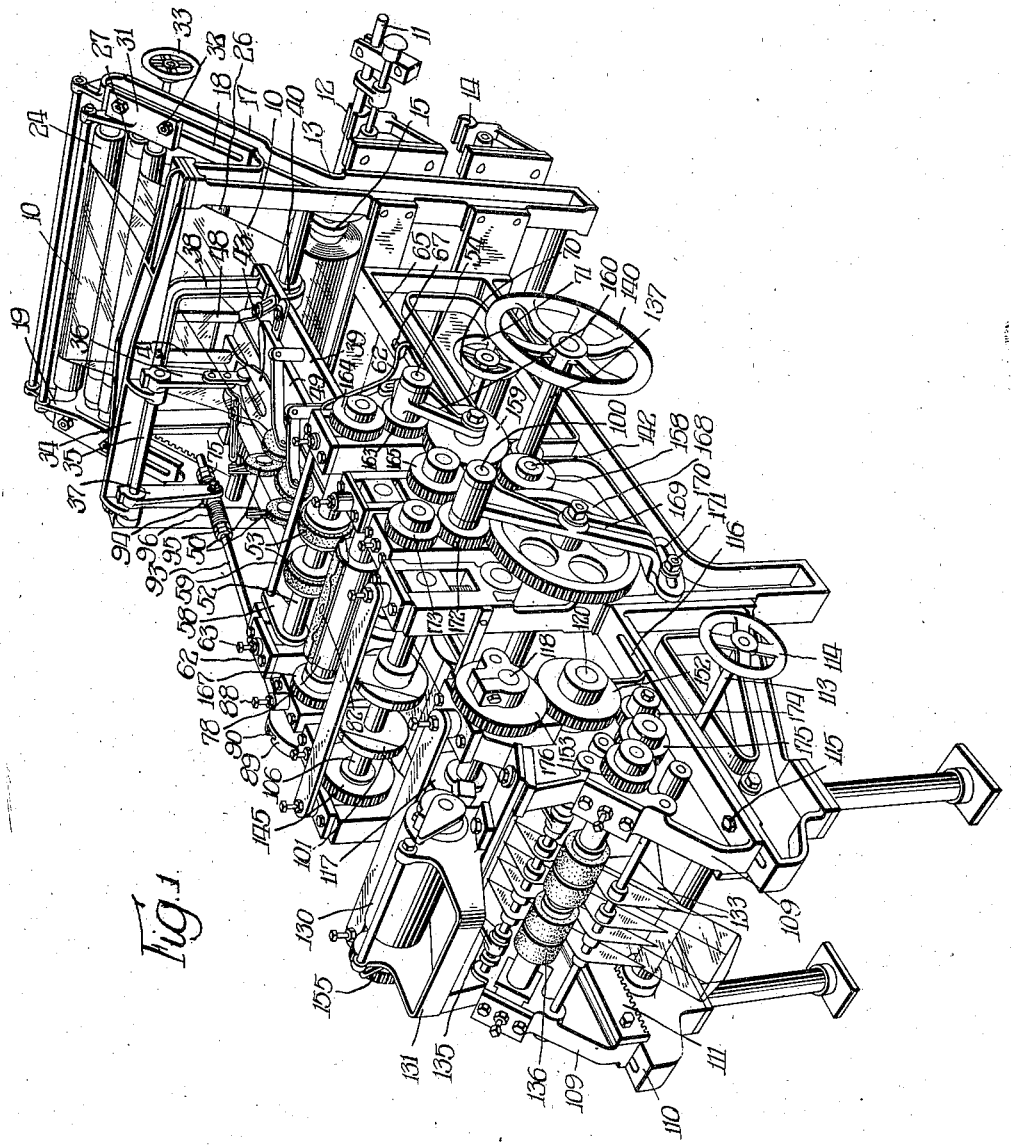
Inventor:
William H. Engel,
By Cromwell, Greist & Warden
attys.

Oct. 13, 1936.  W. H. ENGEL  2,057,295
BAG MACHINE
Filed Oct. 20, 1932  12 Sheets-Sheet 2
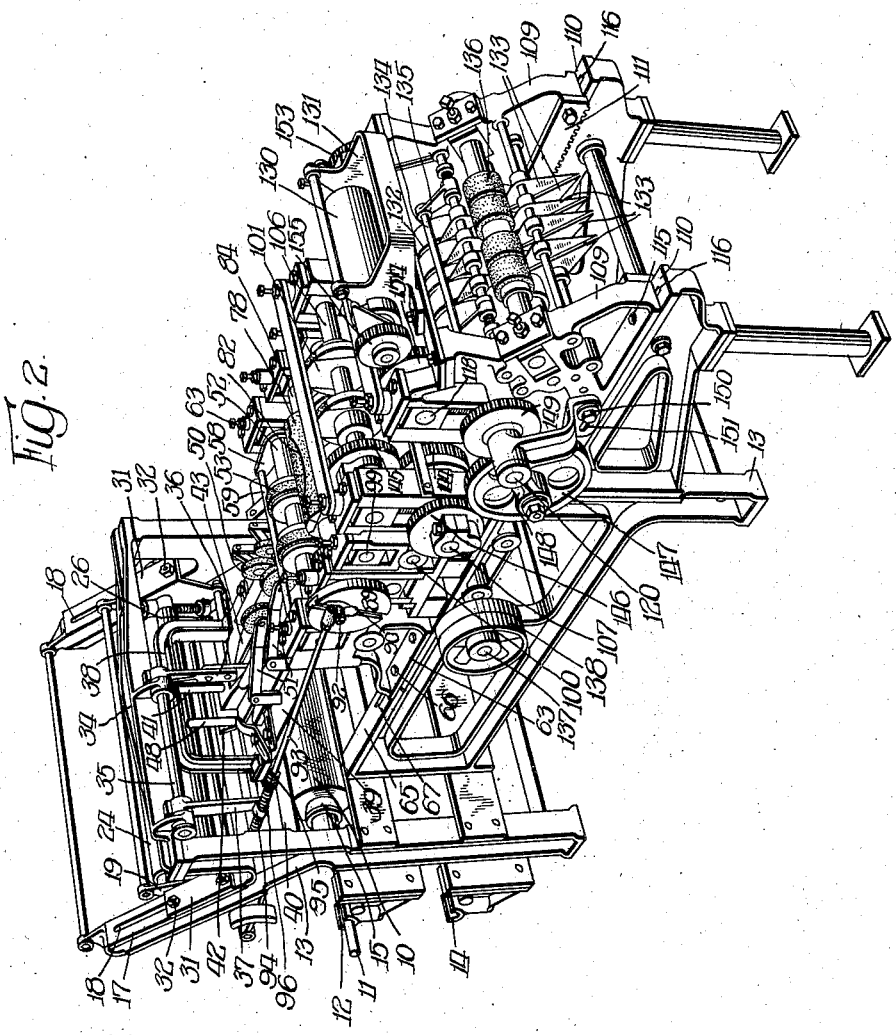
Inventor:
William H. Engel,
By Cromwell, Greist & Warden
attys Oct. 13, 1936.  W. H. ENGEL  2,057,295
BAG MACHINE
Filed Oct. 20, 1932  12 Sheets—Sheet 3
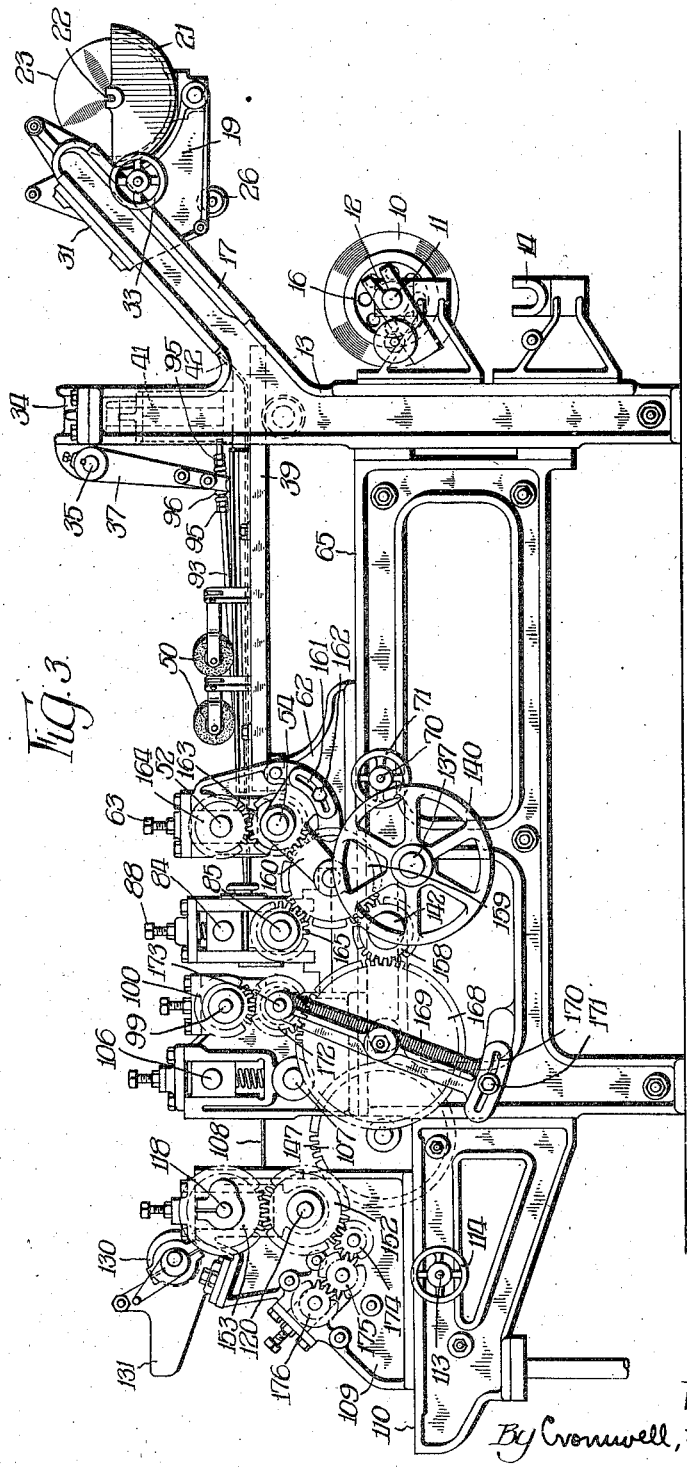
Inventor:
William H. Engel,
By Cromwell, Greist & Warden
attys.

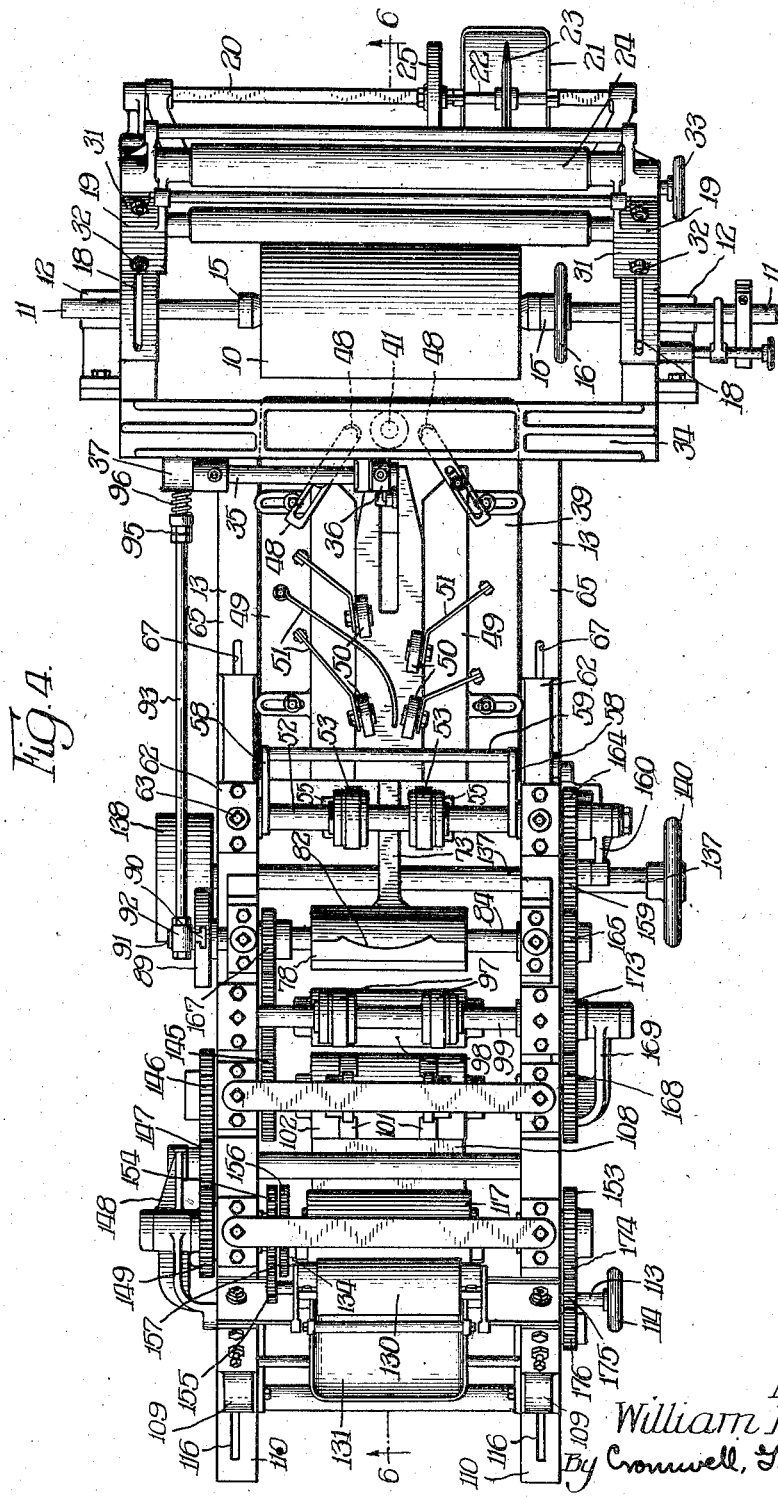

Oct. 13, 1936.                    W. H. ENGEL                    2,057,295
                                  BAG MACHINE
                            Filed Oct. 20, 1932            12 Sheets-Sheet 5
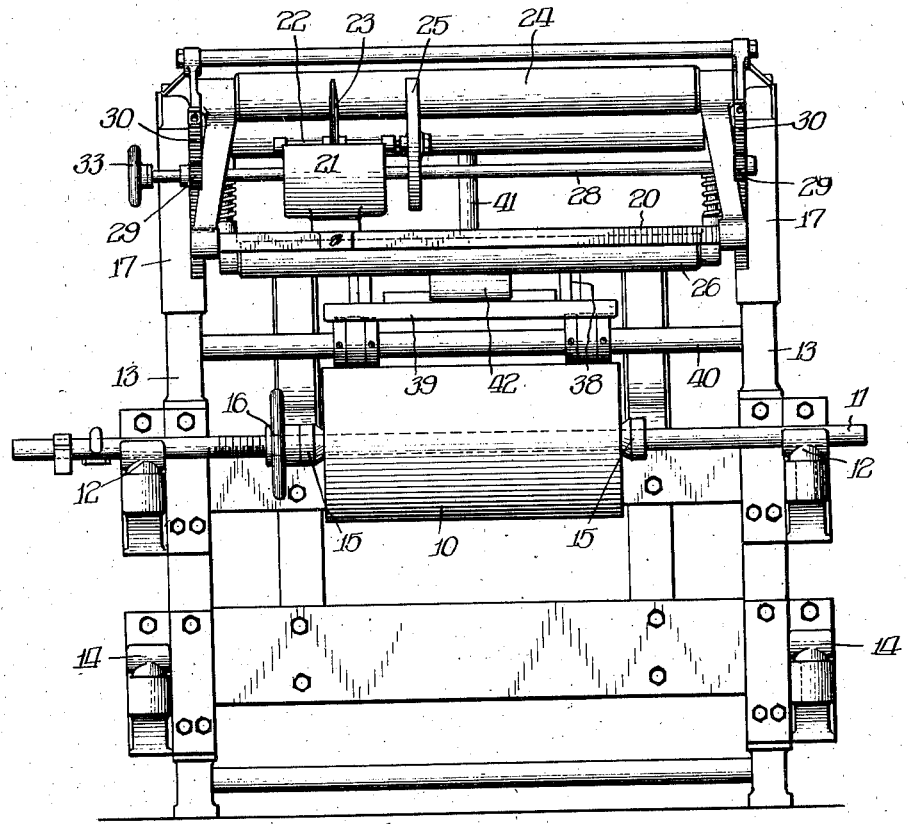
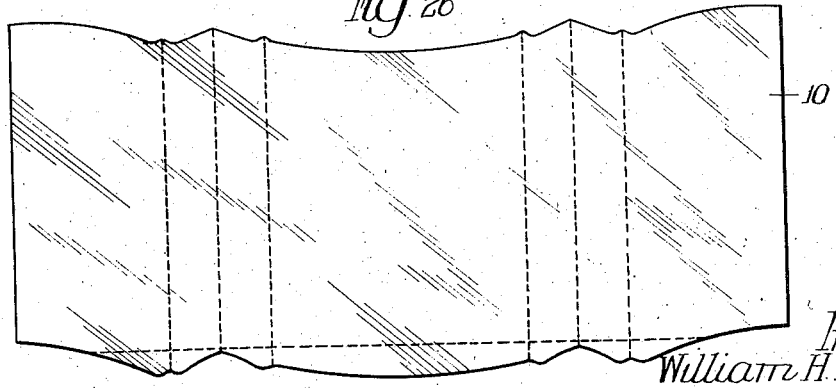

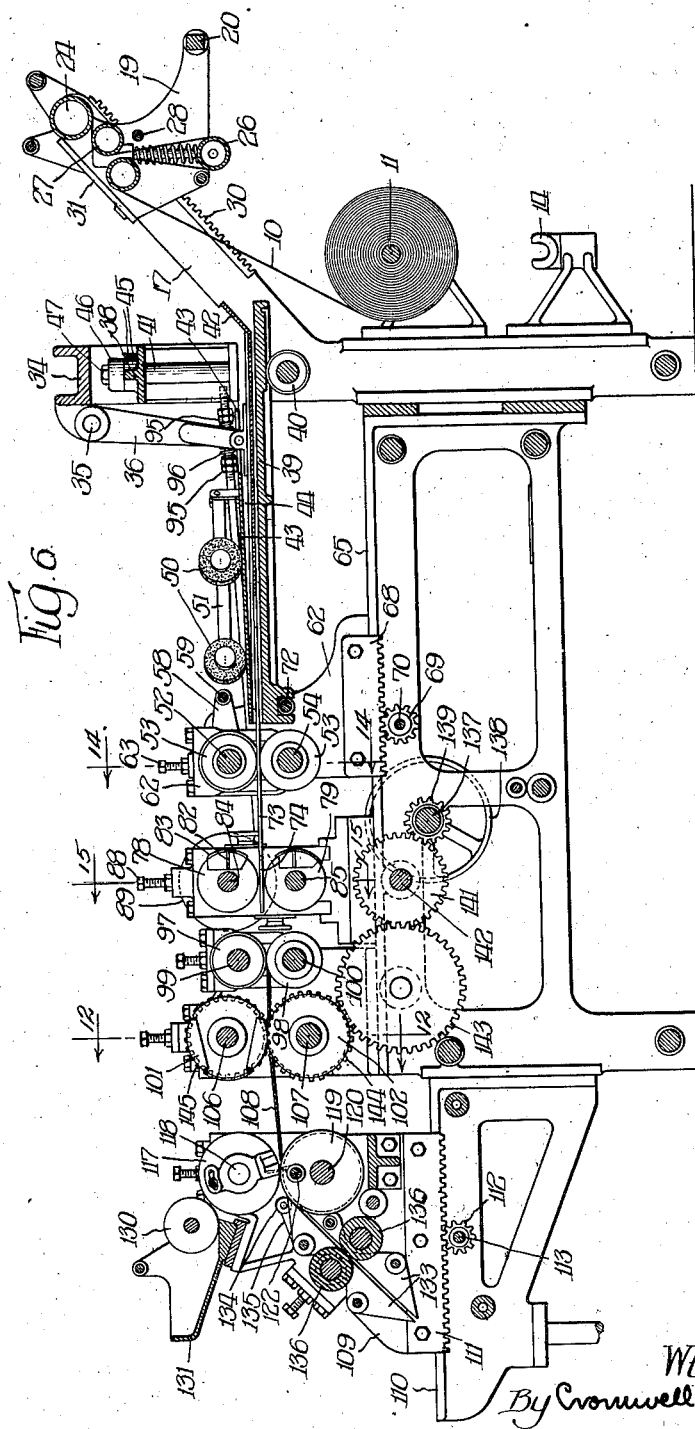
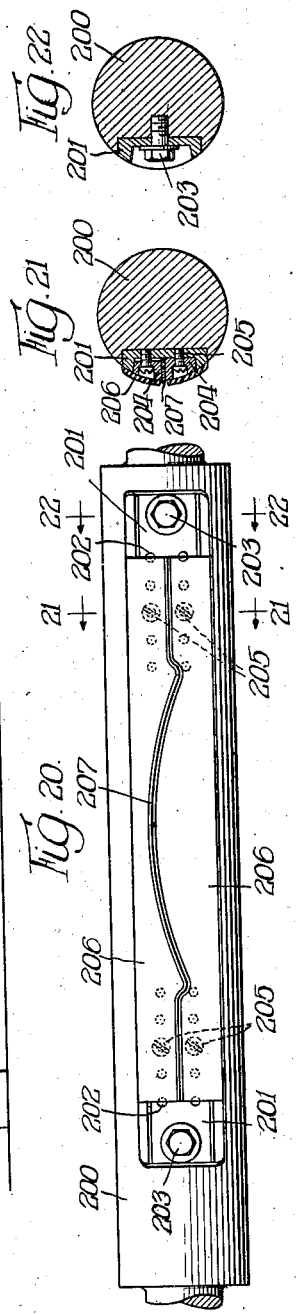

Oct. 13, 1936.  W. H. ENGEL  2,057,295
BAG MACHINE
Filed Oct. 20, 1932    12 Sheets-Sheet 7
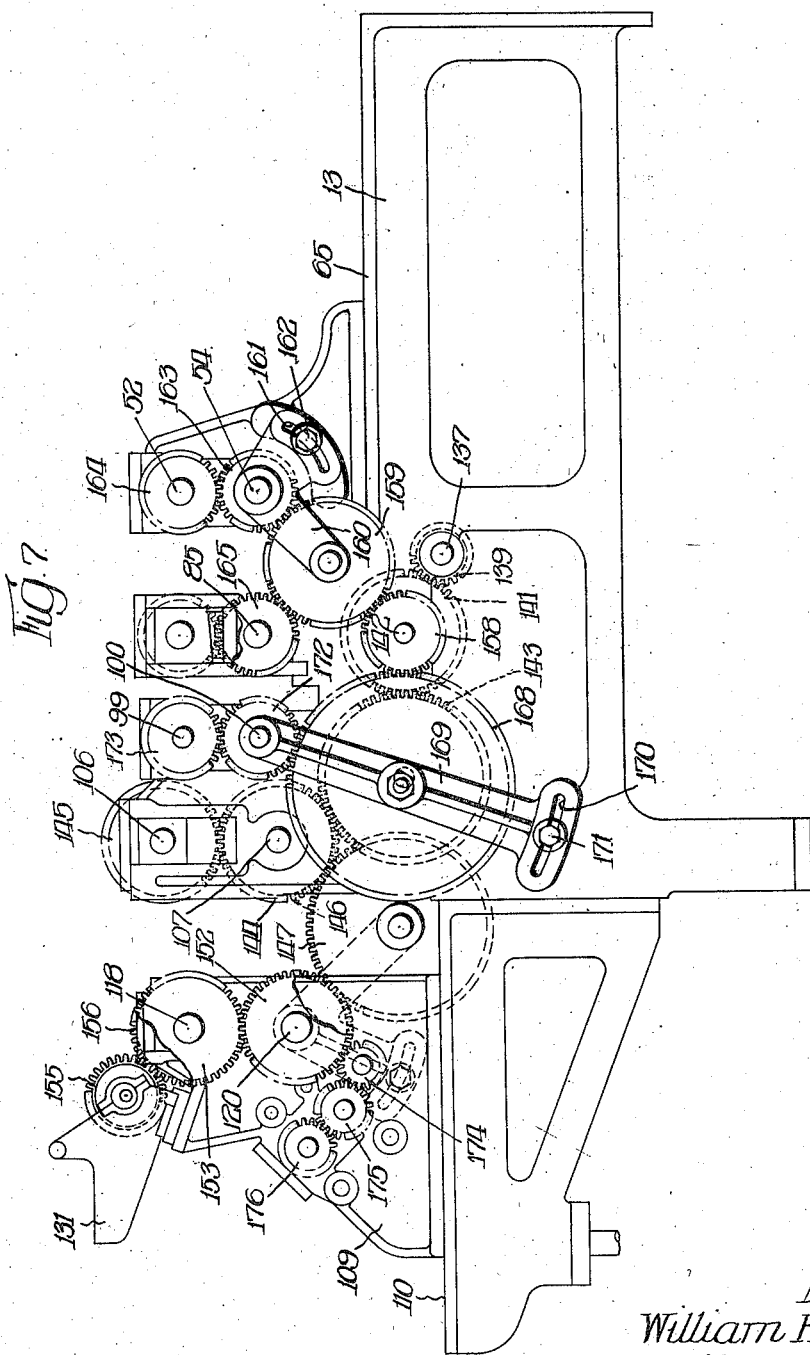
Inventor:
William H. Engel,
By Cromwell, Greist + Warden
Attys.

Oct. 13, 1936.  W. H. ENGEL  2,057,295
BAG MACHINE
Filed Oct. 20, 1932  12 Sheets-Sheet 8
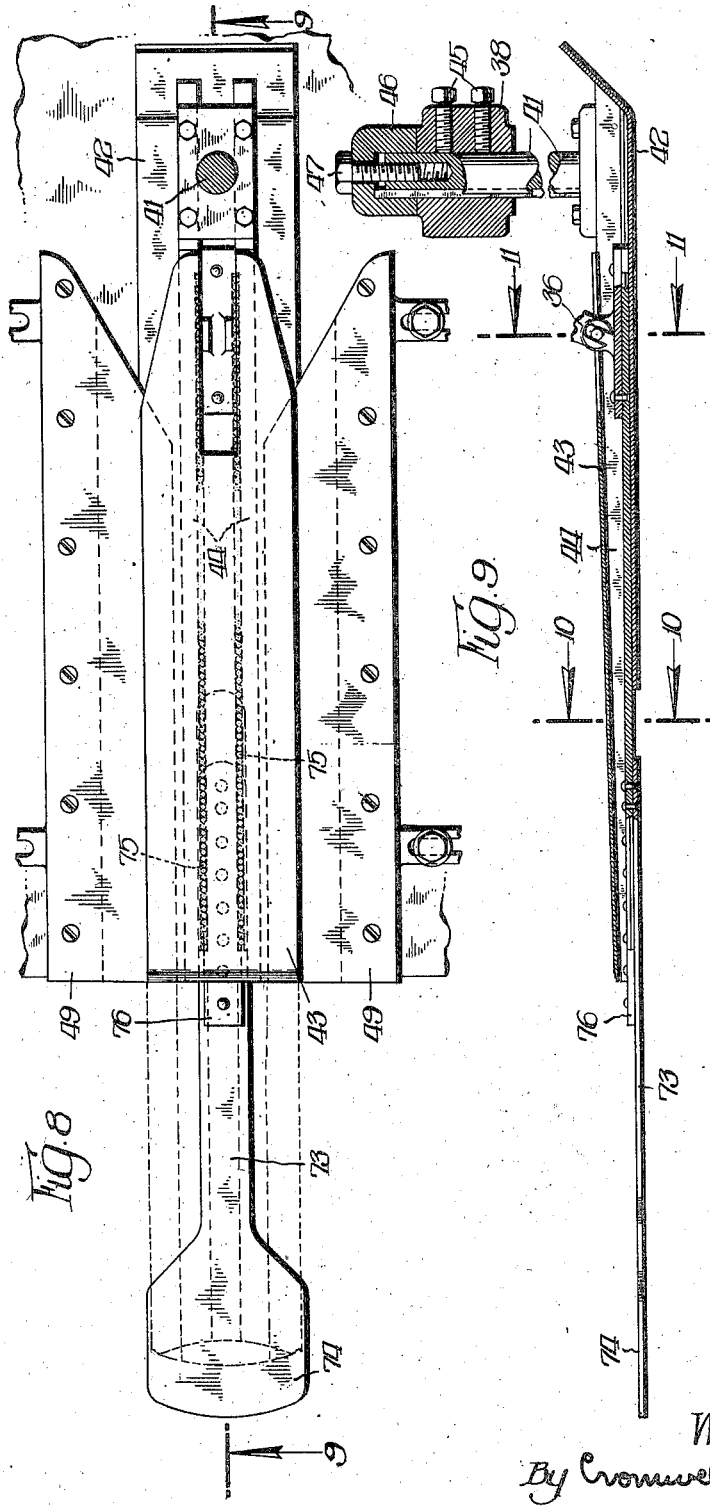
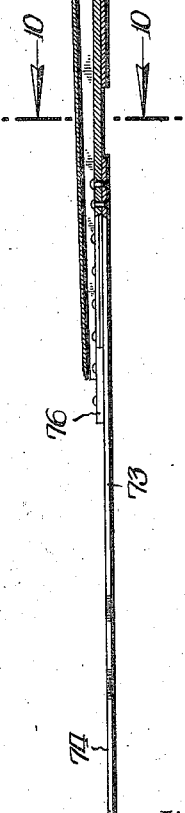
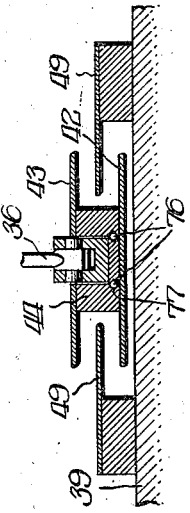
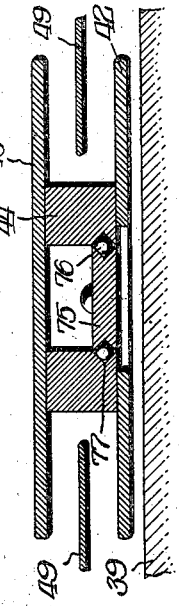
Inventor:
William H. Engel,
By Cromwell, Greist & Warden
attys.

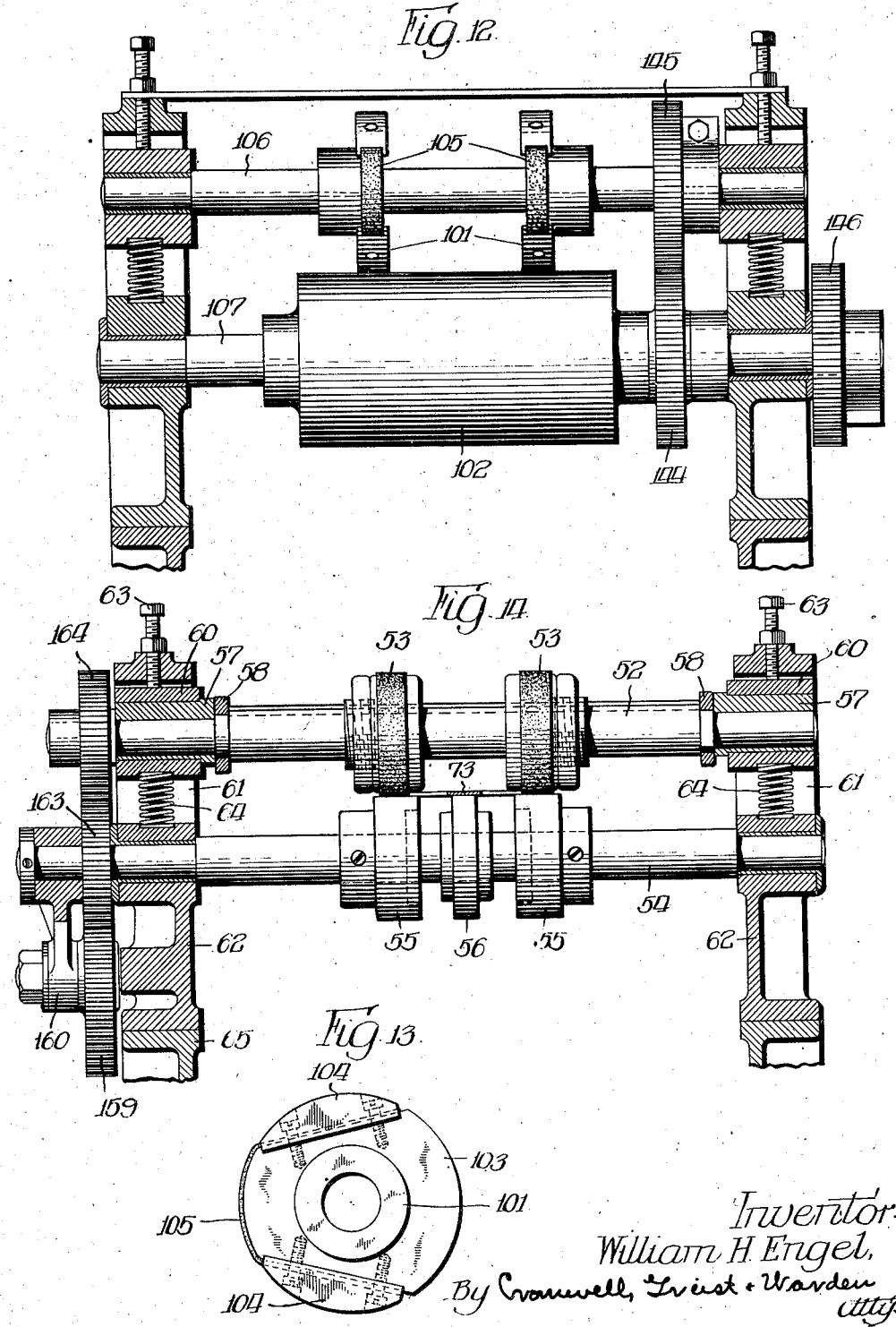

Oct. 13, 1936.  W. H. ENGEL  2,057,295
BAG MACHINE
Filed Oct. 20, 1932  12 Sheets-Sheet 10

Inventor:
William H. Engel,
By Cromwell, Greist + Warden
Attys

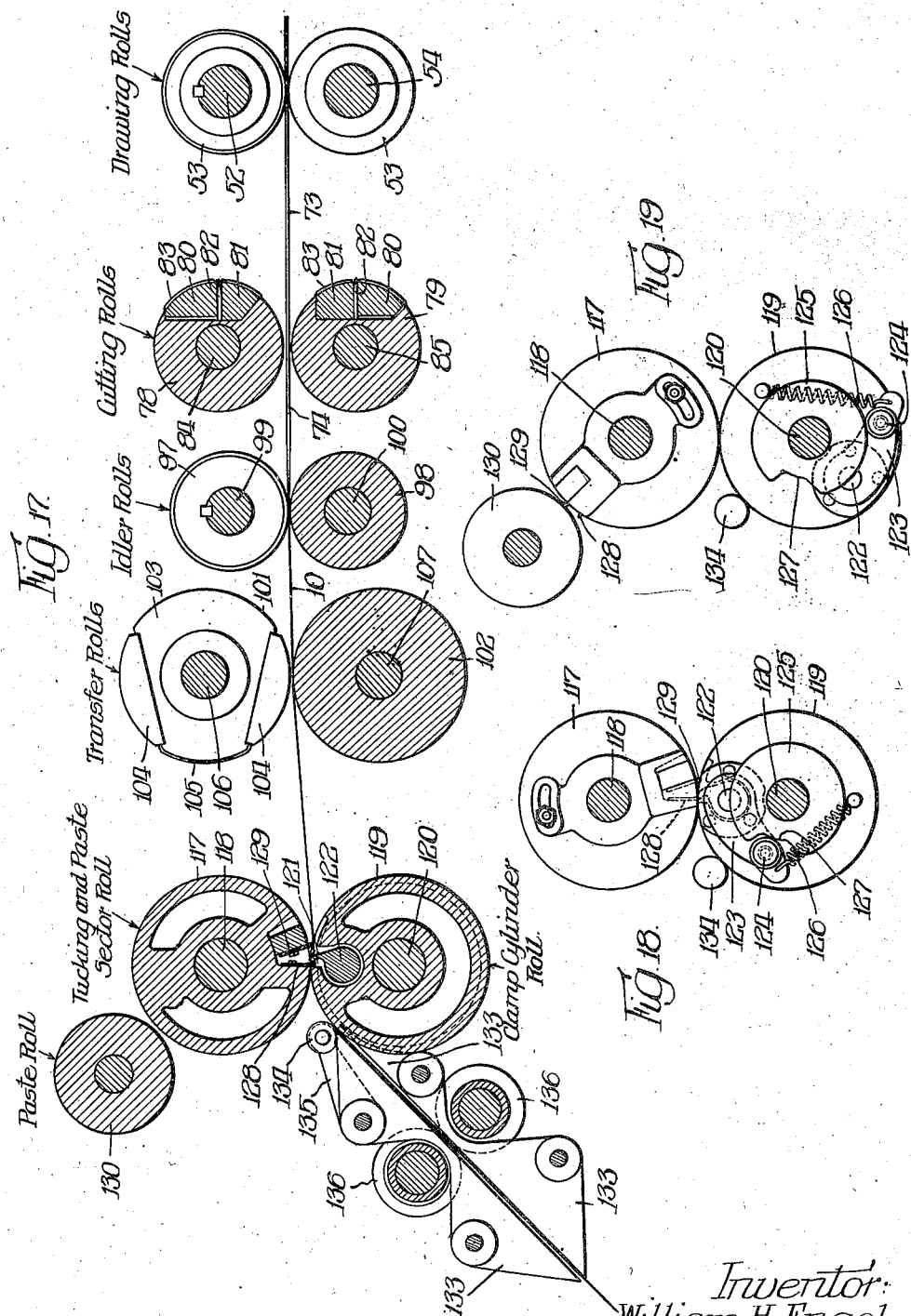

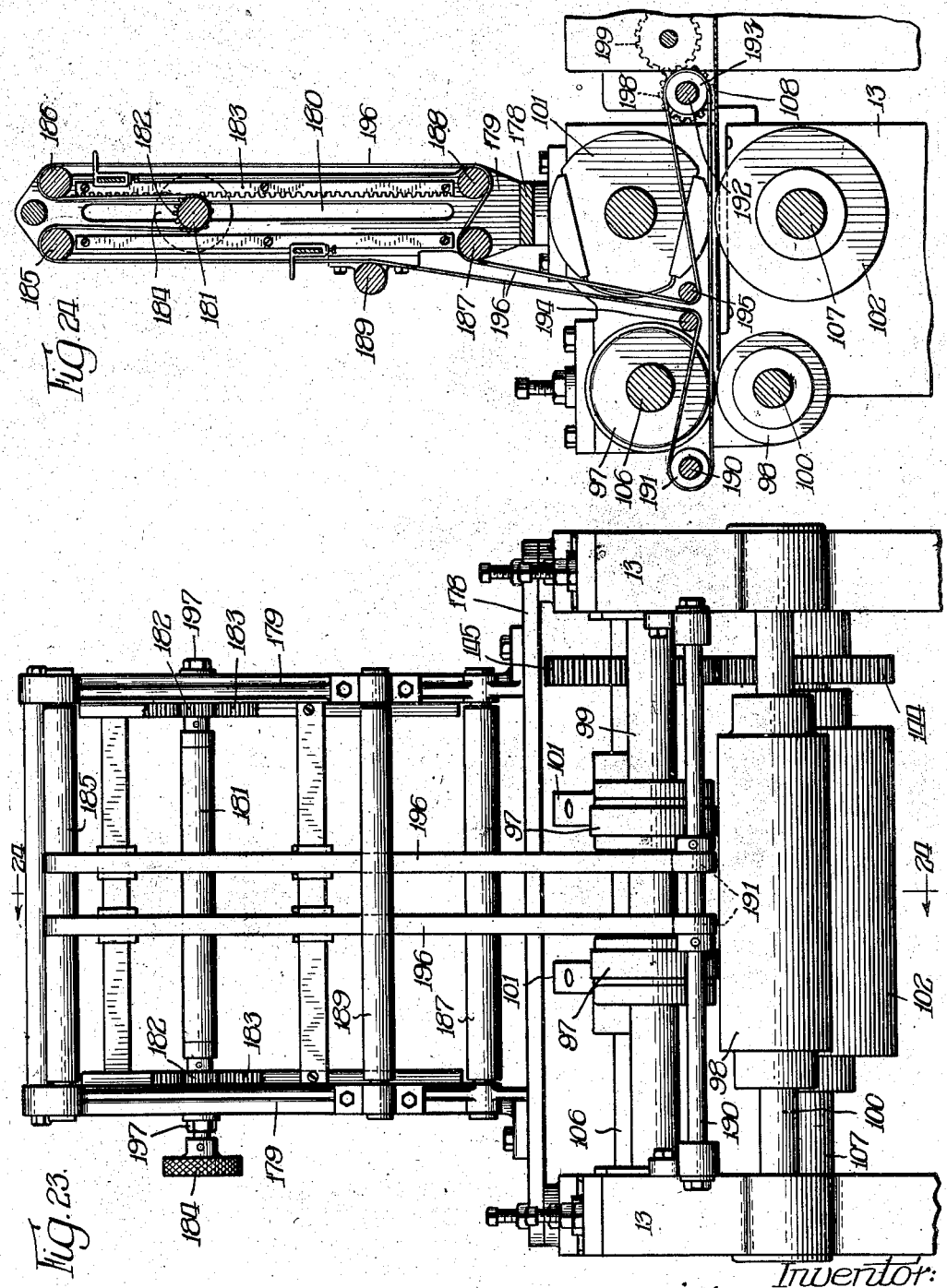

Patented Oct. 13, 1936

2,057,295

UNITED STATES PATENT OFFICE 2,057,295

BAG MACHINE

William H. Engel, Chicago, Ill., assignor to Shellmar Products Company, Chicago, Ill., a corporation of Delaware Application October 20, 1932, Serial No. 638,758

28 Claims. (Cl. 93—19)

The present invention relates to bag-making machines, and has particular reference to improvements in bag machines of the type described in United States Patent No. 1,265,270 issued May 7, 1918, which improvements facilitate the production of bags from material such as cellulose sheeting or Cellophane as well as from ordinary paper.

Cellulose sheeting has come into wide use as a wrapping material, and has been employed somewhat extensively for the production of bags, but due to the flexible nature of the material and other characteristics, such as ease of tearing, the production of bags therefrom has not been entirely satisfactory. In one particular, if bag lengths are severed from a tube by means of the ordinary striker bar cut-off mechanism, whereby the ends of the bag length are serrated, the cellulose material tends to tear along the valleys of the serrations, thereby greatly weakening the bag.

A primary object of my invention is to produce an improved bag-making machine.

An additional object is the provision of a machine particularly adapted for the production of bags from material such as cellulose sheeting.

A further object is to provide a bag machine which is durable and rapid in operation.

A still further object is to provide a bag machine which will produce a bag of cellulose material having a smooth cut lip by which opening of the bag is facilitated.

These and other objects will be apparent from a consideration of the following illustrative and explanative description of a preferred embodiment of my invention and by reference to the accompanying drawings, in which Fig. 1 is a perspective view of a bag machine constructed in accordance with my invention, which view is taken from one side of the delivery end of the machine;

Fig. 2 is a perspective view of the delivery end of the machine taken from the opposite side from Fig. 1;

Fig. 3 is a side view of the machine shown in Fig. 1;

Fig. 4 is a top view of said machine;

Fig. 5 is an end view showing the feed end of the machine;

Fig. 6 is a sectional view taken along line 6—6 of Fig. 4;

Fig. 7 is a side view showing the drive mechanism of the machine;

Fig. 8 is a top view of the forming mechanism and the traveling mandrel against which the formed tube is cut into bag lengths;

Fig. 9 is a sectional view taken along line 9—9 of Fig. 8;

Fig. 10 is a sectional view taken along line 10—10 of Fig. 9;

Fig. 11 is a sectional view taken along line 11—11 of Fig. 9;

Fig. 12 is a view of the transfer rolls and their mounting, the latter being in section taken along line 12—12 of Fig. 6;

Fig. 13 is a side view showing the construction of the transfer rolls;

Fig. 14 is a view of the draw rolls and their mounting, the latter being taken along line 14—14 of Fig. 6;

Fig. 17 is a diagrammatic view of the bag-making mechanism devoid of frame and driving structure;

Fig. 18 is an end view of the bottom-forming mechanism in a position for operating on a bag length;

Fig. 19 is an end view of the mechanism shown in Fig. 18 after operating on a bag length;

Fig. 20 is a plan view of a modified form of cutting roll;

Fig. 21 is a sectional view taken along line 21—21 of Fig. 20;

Fig. 22 is a sectional view taken along line 22—22 of Fig. 20;

Fig. 23 is a front view of a modified form of my invention in which guides are provided for the severed bag lengths;

Fig. 24 is a sectional view taken along line 24—24 of Fig. 23;

Fig. 25 is a diagrammatic view showing the various stages in the production of the bag; and Fig. 26 is a plan view of a bag length in unfolded condition.

Figure 15:
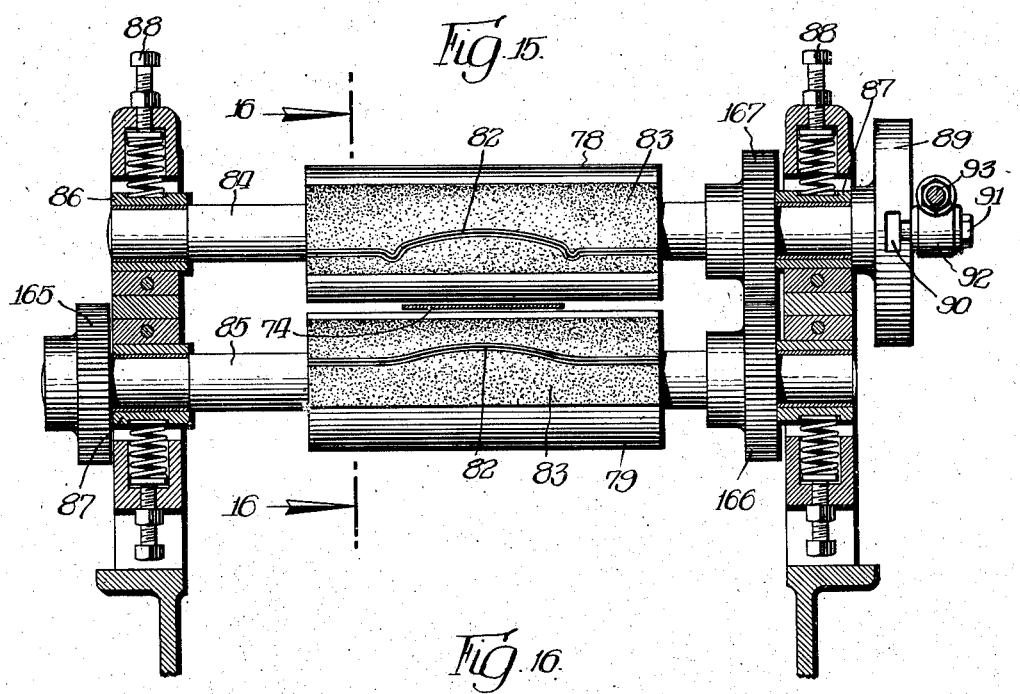
Fig. 15 is a view showing the cutting rolls by which bag lengths are partially severed and their mounting, the latter being shown in section taken along line 15—15 of Fig. 6.

To summarize shortly the operation of the machine, it may be said that a web of cellulose sheeting, the material used in the present description for purposes of illustration and explanation, is formed into a tube, the tube is partially severed by smooth cutting knives carried by rolls and operating in cooperation with the smooth cutting shoe of a reciprocating mandrel traveling between the cutting rolls, the partially severed blank separated by fast transfer rolls, and the severed blank formed into a completed bag by bottom-forming rolls. These various steps are shown graphically in Fig. 25.

As shown in the drawings, a roll of cellulose sheeting 10 is mounted by means of shaft 11 in journals 12 of the frame structure 13. Additional journals 14 are provided in case it is desired to employ two rolls of cellulose material for the production of duplex bags. The roll of cellulose material is centered on shaft 11 and secured in the usual manner by means of blocks 15 and hand wheel 16, the latter being threaded on shaft 11.

The frame structure 13 is provided with backwardly and upwardly extending arms 17 which have the longitudinal slots 18. In these slots are adjustably mounted the secondary frame structures 19 which support a gluing unit. A square cross rod 20 is pivoted in frame structures 19 and supports the adjustable base of a glue pot 21. Shaft 22 is journaled in opposite sides of the glue pot and carries a glue wheel 23 which extends adjacent a roll 24 whereby to apply a thin strip of glue to the edge of the cellulose web as the latter travels over the roll 24. In order to insure rotation of the glue wheel, a rubber faced wheel 25 is mounted to the end of shaft 22 and frictionally engages the roll 24 through the traveling web of cellulose material. Movement of the cellulose web thereby causes rotation of the friction wheel and the glue wheel. The pivoted bar 20 is positioned a distance from the roll 24, sufficient to permit the gluing unit to be held against it by gravity. That is, the pivoted gluing unit tends to fall downwardly about the bar 20 and is stopped by the roll 24.

The web of cellulose material passes from the main roll upwardly about the roll 24, then downwardly about the movable spring roll 26, then upwardly about rolls 27 and 24, and then into the tube-forming mechanism to be described hereinafter. The spring roll 26 has a cushioning effect, thereby preventing breakage of the web when the machine starts or otherwise suddenly changes its speed of operation.

The aforesaid rolls about which the web of cellulose material is passed are provided with shafts journaled in the frame units 19. A transverse shaft 28 extends between the frame units 19 and is provided with gears 29 which mesh with the teeth of rack bars 30 attached to the under side of the arms 17. Bolts 32 pass through flanges 31 in the upper portions of the frame units 19 and are adjustably secured through slots 18 in the arms 17 by means of suitable nuts. By loosening these nuts and rotation of hand wheel 33 mounted on an extension of shaft 28, the entire gluing unit and rolls may be raised or lowered along the arms 17. When the desired position is reached, the bolts 32 are tightened.

From the roll 24 the cellulose web passes into a forming mechanism which converts the glue-carrying web or sheet into a tube from which bag lengths are subsequently taken.

From a point adjacent the lower portion of the arms 17, the frame 13 extends vertically on each side of the machine, the extensions being joined by a cross member to form an arch 34. This arch constitutes a support for the rotatable horizontal shaft 35 to which are attached a downwardly extending arm 36 at the center of the machine and a downwardly extending arm 37 at one side of the machine.

A smaller arch 38 is positioned within the arch 34 and rigidly attached to the rear portion of a horizontal, longitudinally extending table 39, which portion is supported by contact with a roller bar 40 secured to the frame 13. A vertically adjustable bar 41 extends downwardly from the center of the arch 38. To the bottom of this rod is suspended the forming unit shown in detail in Figs. 8, 9, 10, and 11.

The forming mechanism shown in the drawings is for the production of a tube having a bellows fold, and consists of a base plate 42 having an upwardly turned portion at its rear end and an upper plate 43 spaced from the lower plate by means of edgewise bars 44.

The bar 41 is secured in an opening in the arch 38 by means of set screws 45. A cap 46 is fitted over the top of bar 41 and against the arch support. To regulate the vertical position of the bar 41 and consequently the distance above the table of the lower tube-forming plate 42, the set screws 45 are loosened and set screw 47 extending through cap 46 and into the internally threaded upper end of bar 41 is properly set. Set screws 45 are then tightened to maintain the bar 41 in its proper position. In the production of bags of varying size it is necessary to employ forming plates of corresponding widths. As the plates for wider bags are substantially heavier than the plates for smaller bags, and as the plates are suspended from their rear end by the rod 41, the front end of the heavier plates tend to dip more toward the table than in the case of lighter plates for smaller bags. Therefore, it is desirable to raise the rod 41 higher where wide bags are produced.

The cellulose web travels downwardly from the roll 24 and beneath the lower plate 42. Change of the direction of travel of the cellulose web from a downward angle, which is preferably not over 45° from the horizontal, to the horizontal causes the side portions of the web extending beyond the plate 42 to turn upwardly, this action being assisted by the adjustable upright guides 48 positioned on each side of the plate 42 adjacent the point at which the web changes direction. Adjustable bellows forming plates 49 are secured to the table 39 and extend inwardly between the upper and lower plates 43 and 42. As the web of cellulose material travels forwardly beneath the lower plate 42, its upwardly extending sides are pressed inwardly by the plate 49, thereby forming a bellows fold. The upwardly extending sides of the cellulose web are threaded under and pressed against the top plate 43 by rubber friction rollers 50 which tend to draw said sides inwardly, thereby maintaining the web in a tight condition about the forming mechanism. These free sides of the web, one of which has a narrow strip of glue adjacent its edge, are then overlapped with the glued side forming the top layer, the sides being prevented from contacting and smearing before in properly overlapped condition by the finger 51 which presses the lower or unglued side of the web downwardly. The two free sides of the web are then brought together, the glue securing them to form a tube from which bag lengths are subsequently removed.

After the free edges of the web are drawn together by the rubber friction rollers, the resulting cellulose tube passes between a set of draw or feed rolls, shown in detail in Fig. 14. An upper shaft 52 carries two rubber faced friction draw rolls 53 which are adjustable longitudinally of shaft 52 in order to accommodate different width tubes. It is preferred that the rolls 53 be adjusted so as to grip the cellulose tube along the bellows fold. A lower shaft 54 is provided with adjustable steel rolls 55 which are positioned beneath the upper friction rolls 53 and a central roll 56. The rolls 53 and 55 are in firm engagement with the cellulose tube and upon operation of the machine cause the web to continuously travel through the tube-forming mechanism in the manner described heretofore.

In order to permit the cellulose web to be threaded through the machine with ease, the shaft 52, upon which the upper draw rolls are positioned, is mounted eccentrically in rotatable bearings 57. The latter are rigidly connected to lever arms 58 which have a connecting bar 59 to permit ready rotation of the bearings. It will be seen that when the rod is in lowered position the thin portion of the bearing is down, thereby permitting contact of the drive rolls, as shown in Fig. 14. By rotation of the bar 59 the thick portions of the bearings 57 are down and the drive rolls 53 and 55 are spaced a distance equal to the difference in width of the thick and thin portions of the bearings 57, whereby the cellulose web may be threaded through the machine with ease. It is preferred to raise the bar 59 when the machine is not in use in order to prevent flat spots from occurring in the rubber faced draw rolls, due to continued contact with steel rolls 55.

The bearings 57 are rotatably mounted in adjustable blocks 60 positioned in the guides 61 of the drive roll frame members 62. The initial vertical position of the bearing blocks is determined by regulation of set screws 63, springs 64 pressing the blocks upwardly, as will be understood, thereby providing for different thicknesses of material and wear of the rolls 53. The frame members 62 are adjustably secured to horizontal portions 65 of the frame 13 by means of bolts 66 and slots 67 in the portions 65. Rack bars 68 are attached to frame members 62 and mesh with gears 69 which are mounted on a shaft 70. By loosening bolts 66 and actuating the hand wheel 71 which is attached to one end of shaft 70, it is possible to move the entire draw roll unit longitudinally of the machine, the desired position being maintained by tightening the bolts 66.

Between the draw roll frame members 62 there extends a bar 72 to which is rigidly attached the front end of the table 39, as shown in Fig. 6. It will be seen that through this connection longitudinal movement of the draw roll unit will cause similar movement of the table, the tube-forming unit, and the arch 38.

From the draw rolls the cellulose tube is delivered to a cutting mechanism that removes bag lengths of proper shape. The tube is first partially severed by score-cutting its top and bottom portions with cutting rolls and a traveling mandrel. The partially severed bag length is held to the tube by a small unsevered portion corresponding in width to the thickness of the mandrel, and complete severance is effected by passing the bag length through transfer rolls which are driven at a higher speed than the cutting rolls, thereby causing the bag length to be torn free from the tube.

The traveling mandrel consists of a thin bar 73 having a hardened cutting shoe 74 at its front end and being reciprocally mounted in a slot in the lower plate 42, the end of the slot forming a stop to limit the backward movement of the mandrel. To the upper face of the rear portion of bar 73 is attached a thicker bar 75 which extends to adjacent the rear of plate 42 and is attached to the forked end of arm 36. As the mandrel moves with extreme rapidity, which may be of the order of 250 cycles per minute, it is important that the element of friction be reduced to a minimum. To obtain free movement of the mandrel in accordance with my invention, the bar 75 is mounted on the bars 44 by means of ball bearings 76, suitable races 77 being cut in the inner faces of bars 44 and in the outer faces of bar 75.

Figure 16:
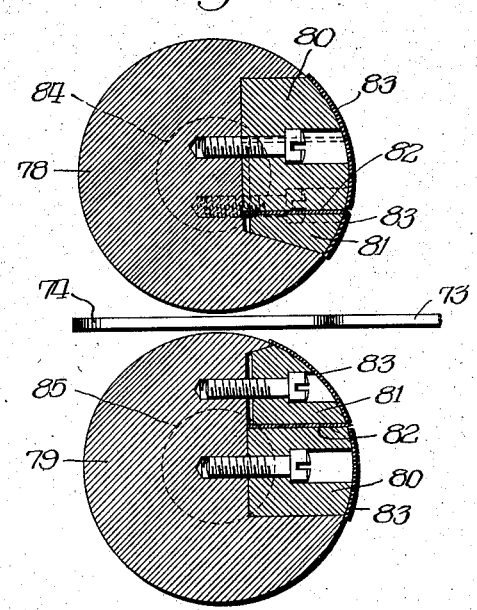
Fig. 16 is a sectional view taken along line 16—16 of Fig. 15.

After passing through the draw rolls, the cellulose tube is received by an upper cutting roll 78 and a lower cutting roll 79. These rolls are of the same circumference as the length of the bag blank which it is desired to cut. Knives 82 of any desired shape are mounted in the cutting rolls by wedge blocks 80 and 81, the knives 82 extending beyond the outer surface of the cutting roll. After the wedge blocks are secured in place by suitable screws, layers 83 of a resilient material such as rubber are adhesively secured to the cutting roll about the knives 82, as shown in Figs. 15 and 16, the knives extending substantially to the surface of the rubber layers.

The cutting rolls 78 and 79 are mounted on shafts 84 and 85, respectively, and these shafts are journaled in adjustable bearing blocks 86 and 87, respectively, which blocks are carried by the frame structure. The vertical positions of the cutting rolls are regulated by set screws 88, so that the cutting shoe will be directly between the rolls, as will appear hereinafter.

Centrally mounted to one end of shaft 84 is a round disk or eccentric wheel 89 having diametric T-slot 90 in its outer face. In this slot is mounted an adjustable stud 91 which may be set in the slot any radial distance from the center of shaft 84. To the stud 91 is rotatably attached a sleeve 92. A rod 93 has one end connected to the sleeve 92 and its other end resiliently secured to the lower portion of the arm 37. A swivel connection 94 is joined to arm 37 and rod 93 passes freely through an opening therein. The rod 93 is threaded for a substantial distance on each side of the swivel connection and nuts 95 are positioned adjacent each end of the threaded portion. Between the nuts and the swivel connection are provided compression springs 96, suitable spring washers being positioned on the rod at each end of the springs. Motion of rod 93 is imparted to arm 37 through the springs 96, thereby providing a resilient connection.

The cutting knives on rolls 77 and 78 are positioned so as to be operable at substantially the same time. A suitable gear is keyed to shaft 85 of the lower cutting roll and meshes with a similar gear of the same size keyed to shaft 84 upon which the upper roll is mounted, thereby providing synchronous driving means for the two rolls.

The diametric T-slot 90 points in the direction of the cutting knife of the upper cutting roll. In other words, when the roll has been rotated until the cutting knife is on the bottom of the roll and in cutting position, the T-slot is in vertical position.

It will be seen that rotation of the cutting rolls causes rotation of the eccentric wheel, which, in turn, imparts a reciprocal motion to rod 93. This motion causes arm 37 and consequently arm 36 to move backwardly and forwardly through an arc determined by the length of the stroke of rod 93. As arm 37 moves the traveling mandrel is moved in the same direction, causing the cutting shoe 74 to reciprocate between the cutting rolls.

To impart to the cutting shoe during the cutting operation a speed substantially equal to the speed of the cutting rolls during the cutting operation, the stud 91 is set a radial distance from the center of shaft 84 equal to the radius of the cutting rolls. By positioning the T-slot in a radial manner with respect to the cutting knife of the upper cutting roll, the cutting shoe of the traveling mandrel is given substantially the same speed as the cutting rolls at the moment the cutting knives are in operative position. In this manner the upper and lower knives press against the smooth surface of the cutting shoe so as to impart a score cut to the cellulose material without a pronounced wiping effect of the knives across the cutting shoe such as would be the case if the cutting rolls traveled faster or slower than the cutting shoe.

During the cutting operation the cutting shoe is between the cutting rolls and is thrust in the same direction of travel of the cutting rolls. The speed of the shoe increases to a maximum which equals the speed of the cutting rolls as the T-slot approaches a vertical position and then decreases toward zero as the T-slot approaches a horizontal position. As the cutting knives are of curved shape it is seen that the cutting operation begins before the maximum speed of the cutting shoe is reached and continues as the speed of the cutting shoe decreases from this maximum. In other words, unless otherwise prevented, the cutting knives would have a slight wiping effect where the T-slot is not in exact vertical position. However, in accordance with my invention the rubber layers 83 grip the cutting shoe before the cutting knives reach their operative position and impart to the shoe a speed equal to the speed of the cutting rolls, thereby insuring a perfect score cut. As the rubber extends on both sides of the cutting knives, the speed of the knives and the shoe remain equal throughout the cutting operation.

When the rubber layers 83 grip the cutting shoe, the speed of the latter is increased above the speed naturally imparted to the traveling mandrel by the eccentric wheel, rod 93 and arms 36 and 37. If the last named connections were rigid, the shoe would be prevented from increasing in speed. By employing the resilient connection between the rear end of rod 93 and arm 37, the increase of speed of the cutting shoe merely causes the forward spring of the connection to be compressed. After the T-slot has passed its vertical position in the cutting operation, the cutting shoe is prevented from slowing down by continued contact with the rubber layers, thereby compressing the rear spring of the resilient connection. When the cutting operation is complete and the rubber layers have rotated out of contact with the cutting shoe, the latter is returned to its natural position by the rear spring of the resilient connection.

Thus, in the cutting operation the traveling mandrel reciprocates within the cellulose tube and between the cutting rolls. The cutting shoe is preferably beneath the bellows fold whereby the upper knife score-cuts through three layers of cellulose adjacent the edge of the tube and one layer between the opposite bellows folds, while the lower knife score-cuts a single layer.

By providing smooth cutting knives and a smooth, hardened cutting shoe against which these knives rotate, the bag is given a smooth-cut edge as distinguished from a serrated edge.

As shown in the drawings, the upper cutting knife has a main curved portion provided at each of its ends with a tangential reverse curve. The main curve strikes a lip portion from the tube, while the tangential reverse curve cuts to the outer edge of the tube, forming an upwardly extending tip at the outer creases of the bag length. If the cellulose material comes down to a point at the creases, the bag is weakened in that the material tears easily along the crease. By making the cellulose sheeting come up to a point along the crease, the tendency of the bag to split is considerably decreased. The complementary portion of the tube from which the bag length is severed is subsequently folded over to form a bottom section.

Where a curved knife is employed, the contact of the knife with the cutting shoe is, theoretically, along two points rather than along the entire edge of the knife as would be the case if a straight, transverse knife were used. The two point contact between a curved knife and the smooth cutting shoe permits effective and prolonged operation of the cutting device.

As the upper and lower cutting knives operate against the faces of the smooth cutting shoe, the bag length remains attached to the tube by thin portions which represent the cellulose material along the vertical edges of the cutting shoe. The partially severed bag length passes from the cutting rolls between a pair of rubber covered upper idler rolls 97 and a lower idler roll 98, positioned on shafts 99 and 100, respectively. The ends of shafts 99 and 100 are journaled in bearing blocks which are adjustably mounted in suitable guides in the frame structure, in the manner described with respect to the cutting rolls. The vertical positions of the shafts are regulated so that the idler rollers grip the partially severed bag length somewhat firmly. The peripheral speed of the idler rolls is the same as the peripheral speed of the draw rolls.

After passing between the idler rolls the partially severed bag, still attached to the tube, passes between the upper transfer rolls 101 and the lower transfer roll 102. The two upper transfer rolls consist of rotatable disks 103 having detachable portions 104. A strip 105 of rubber or similar material is placed over a portion of the periphery of each of the disks 103 and the ends of the rubber strip are secured beneath the detachable portions 104. The rubber portions appearing on the periphery of the disks extend radially beyond the remainder of the disks. The upper transfer rolls 101 are adjustably mounted on a rotatable shaft 106 and the lower transfer roll 102 is mounted on a rotatable shaft 107. These shafts are journaled in bearing blocks which are adjustably mounted in guides in the frame structure as described in connection with the cutting rolls. The vertical positions of the upper transfer rolls are such that the rubber portions of the disks touch the lower transfer roll and the remainder of the disks clear the lower transfer roll a distance greater than the thickness of the bag lengths.

Thus, when the partially severed bag lengths pass between the upper and lower transfer rolls, the cellulose material is engaged only when the rubber strips are in down position against the lower transfer roll. These rubber strips are so positioned that they engage the partially severed bag length after the cut portion has passed through the idler rolls.

The transfer rolls are larger in diameter and have a greater peripheral speed than do the draw rolls and the idler rolls. As a consequence, the partially severed bag portion is carried forward at a more rapid speed as soon as it is engaged by the rubber section of transfer rolls, thereby jerking or tearing the bag length away from the tube to which it is partially attached.

In this manner severance of the bag length is completed, and the resulting bag blank is carried into an end or bottom-forming mechanism in which one end of the blank is suitably folded or tucked and glued to complete the bag structure, a plate 108 being interposed between the transfer rolls and the bottom-forming mechanism to guide the bag blanks into the latter.

The bottom-forming device is constructed as a unit having frame members 109 mounted on horizontal portions 110 of the base frame 13 and movable longitudinally thereof. That is, the device is adjustable so that its distance from the transfer rolls may be varied in accordance with the length of the bag blanks. The adjustment is made by means of racks 111 on the frame members 109 and rack gears 112, the latter being keyed to a transverse shaft 113 operable by a hand wheel 114. After the unit is adjusted to the proper position, bolts 115 extending through slots 116 in the base frame member 109 are tightened to secure the unit in place.

In the bottom-forming unit an upper tucker and paste sector roll 117 carried by shaft 118 rotates in juxtaposition with a lower clamp cylinder roll 119 mounted on shaft 120. Shafts 118 and 120 are journaled in adjustable bearing blocks carried by suitable vertical guides in the frame structures 109 as described in connection with the mounting of the cutting rolls. The lower roll is provided with a cut-out portion having a rotatable end clamping member 121 mounted therein and adapted to be moved to and from the back wall of the cut-out portion of the roll. In open position, that is, when the end crimping or clamping member 121 is moved away from the wall of the roll, a slot is provided into which the bag blank is pressed or tucked at the point it is desired to turn the cellulose material over to form a bottom for the bag. The clamping member is rotatably mounted on a shaft 122, to one end of which is attached a lever arm 123. To the free end of the lever arm is attached a cam roller 124. As the roll is rotated, the cam roller travels about a stationary cam 125, thereby actuating the clamping member, a spring 126 being provided to maintain the cam roller in contact with the cam. As shown in Figs. 18 and 19, the cam has a low portion 127 positioned to receive the cam roller at the moment it is desired to close the clamping member. After this member has crimped the turned over end of the bag the cam roller hits a high portion of the cam, thereby opening the clamping member and allowing the bag to be discharged.

The upper or tucker and paste sector roll 117 is also provided with a cut-out portion. In this portion is mounted a radial tucker blade 128 which extends beyond the surface of the roll and is adapted to enter the slot formed by the clamping mechanism of the lower roll. Spaced from the tucker blade 128 is a glue sector 129 which is adapted to apply a thin strip of glue transversely of the bag blank and a short distance above the crimped portion about which the end of the bag is turned over as shown in Fig. 17. This glue strip engages the turned over end of the bag and secures it in place to form a bottom for the bag.

The glue sector extends outwardly beyond the blade 128 and in rotating contacts a glue wheel 130 which rotates in a glue reservoir 131 mounted above the upper roll and on the frame members 109.

As the upper and lower bottom-forming rolls rotate toward operative position the transfer rolls move the end of the bag blank between the bottom-forming rolls so that the end of the bag blank overlies the slot formed by the clamping device of the lower clamp cylinder roll. The tucker blade 128 of the upper roll then engages the bag blank and presses it into the slot. As the cam roller hits the low portion of the cam the clamping mechanism begins to close, reaching its completely closed position as the blade 128 rotates out of the slot, thereby firmly clamping the turned over end portion of the bag.

The bottom roll is provided with a series of spaced transverse slots 132 into which extend from the delivery side of the roll a corresponding number of strippers 133 which kick the crimped bag out of the slot into which it is crimped just as the clamping device is released. After being removed from the slot the crimped end of the bag passes between the lower roll 119 and a small bottom folding roll 134 which is pressed against the roll 119 by means of spring-pressed arms 135 upon which the bottom folding roll is mounted. The turned over end of the bag is thereby pressed against the strip of glue on the side of the blank to complete the formation of the bottom of the bag. The completed bag passes between the upper and lower strippers or guides 133 and into a suitable hopper or carrier (not shown), its progress being facilitated by rubber faced idler rolls 136.

The machine may be driven by any suitable means. As shown in the drawings, rotation is imparted to drive shaft 137 through pulley wheels 138. This shaft is provided with a gear 139 on the side of the machine adjacent the pulley wheels, and a hand wheel 140 on the opposite side of the machine. The wheel 140 is provided in order that the machine may be operated by hand for purposes of observation, adjustment, and the like. Gear 139 meshes with gear 141 of the shaft 142, the latter being suitably journaled in opposite sides of the frame structure. Gear 141 drives an intermediate or idler gear 143 which transfers the power to the gear 144 of the lower transfer roll 102. Meshing with gear 144 is a similar gear 145 which is keyed to the shaft 106 of the upper transfer rolls 101.

The shaft 107 to which the gear 144 is keyed extends through the frame structure and carries on its outer portion a clamp hub gear 146 which is of the same size as gear 144. Gear 146 drives an intermediate or idler gear 147 which is carried by the lower end portion of a swing arm 148 and drives the lower bottom-forming roll 119 by meshing with gear 149 on the shaft thereof. This swing arm is pivoted to an extension of the shaft 120 of the lower bottom-forming roll and has its opposite end adjustably secured to the frame structure by means of slots 150 and bolts 151. By this means the position of the intermediate gear 147 may be changed to compensate for changes in the distance between gear 144 and gear 149, which changes in distance are made by moving the bottom-forming unit away from or toward the transfer rolls to accommodate longer or shorter bags.

On the opposite end of shaft 120 is mounted a gear 152 which meshes with and drives clamp hub gear 153 on shaft 118 of the upper bottom-forming roll 117.

Inside the frame structure, a gear 154 is mounted on shaft 120 and this gear drives gear 155 of the glue roll. A thin gear 156, also mounted on shaft 120 drives a small gear 157 on the shaft of roll 134.

On the opposite side of the machine, a change gear 158 is keyed to shaft 142. The change gear meshes on one side with gear 159 which is carried on the free end of swing arm 160, the latter being pivotally mounted on an extension of shaft 54 of the lower draw rolls and having its opposite end adjustably secured to the frame structure by means of slot 161 and bolt 162. Gear 159 drives the lower draw roll by means of a gear 163 keyed to the shaft 54 thereof. Gear 163 transmits power to a similar gear 164 keyed to the shaft of the upper draw roll 53.

The gear 159 also meshes with a gear 165 on the shaft 85 of the lower cutting roll 79. This shaft carries a gear 166 on its opposite end which drives a similar gear 167 keyed to the shaft of the upper cutting roll. Gear 165 is of the same size as the change gear 158, but as the cutting rolls are spaced apart a sufficient distance to allow the traveling shoe 74 to reciprocate therebetween, it is necessary to employ gears 166 and 167 having one tooth more than gear 165. The shoe 74 is then made of a thickness corresponding to the greater diameter of gears 166 and 167.

The change gear 158 also meshes with a large intermediate gear 168 which is carried by a swing arm 169 pivoted to an extension of shaft 100 of the lower idler roll 98, and adjustably secured to the frame structure by slot 170 and bolt 171. At its upper edge, gear 168 meshes with a gear 172 keyed to shaft 100 of the lower idler roll 98. The gear 172 drives a similar gear 173 mounted on the shaft 99 of the upper idler roll 97.

To an extension of shaft 118 of the upper bottom-forming roll 117 is secured a clamp hub gear 153 which meshes with gear 152 keyed to an extension of the shaft 120 of the lower bottom-forming roll 119.

An idler gear 174 meshes with gear 152 and drives the lower idler roll 98 by means of gear 175, the latter meshing with and driving gear 176 of the upper idler roll 97.

The draw rolls, the cutting rolls, and the idler rolls are designed to have the same peripheral speed so that the tube of cellulose material is drawn through the machine evenly.

Where it is desired to adjust the machine for the production of bags of smaller length than the machine has been previously set for, the draw rolls and forming unit are moved longitudinally toward the cutting rolls, the gluing unit being lowered so that the beginning of the fold over of the web of cellulose material occurs slightly below its last point of contact with the roller 24. The cutting rolls are replaced by smaller rolls having peripheries equal in length to the length of the bag blank it is desired to cut from the tube. The change gear is replaced by a smaller change gear and gear 165 which drives the lower cutting roll is replaced by a gear of the same size as the new change gear. It is also necessary that gears 166 and 167 which drive the cutting rolls be replaced by suitable gears having one tooth more than the new change gear.

By loosening bolt 162 the swing arm 160 may be adjusted so that the idler gear 159 will mesh with the smaller change gear. Bolt 171 is also loosened and swing arm 169 is adjusted in such position that the large intermediate gear 168 will mesh with the smaller change gear as well as with gear 172 which drives the idler rolls.

To provide for a shorter stroke of the traveling shoe 74 the stud 91 of the eccentric wheel 89 is properly adjusted toward the center of the wheel.

As the bag lengths delivered by the transfer rolls will be shorter than the lengths for which the machine has been set previously, the bottom-forming unit is moved toward the transfer rolls by operation of hand wheel 114, bolt 150 of swing arm 148 being loosened and idler gear 147 on the free end of the swing arm being adjusted in accordance with the new position of the bottom-forming unit.

It will be understood that to produce bags of greater length than that for which the machine has been previously set it is necessary only to reverse the procedure described heretofore with respect to adjusting the machine for the production of shorter bags.

Bags of any desired width may be produced on the machine. A web of cellulose material of a width corresponding to the amount of material necessary to make the proper width tube is mounted in the machine and threaded through as described heretofore. In commercial operation, where it is necessary to supply bags of many different widths it is desirable to have on hand a number of forming units of graduated width. To change these units, the bolts which secure the base plate of the rod 41 to the bars 44 are unscrewed and the new unit is secured thereto in place of the old unit. As will be seen from Figs. 8 to 11, the forming unit includes lower plate 42, upper plate 43, bars 44 which are placed on edge and space the upper and lower plates, bar 75 mounted in bars 44, and the traveling shoe. The bellows-forming plates 49 are adjustably secured to the table 39 and are moved inwardly or outwardly as may be needed. The draw rolls, idler rolls, and transfer rolls also are adjustable in width to accommodate tubes of various widths. The cutting knives are changeable, so that knives equal in width to the width of the cellulose tube and the cutting shoe 74 may be employed.

It will be understood that my machine may be employed for producing bags of the envelope type by substituting a single former for the bellows-forming unit described heretofore.

There is a considerable space between the idler rolls and the bag-forming mechanism and the severed bag lengths, particularly when the machine is operated at high speed, tend to fill with air due to the free edges of the bag length traveling rapidly through the free space. Although longitudinally extending fingers or guides might be employed to maintain the bag lengths in flattened condition against the base plate, I have found it preferable to employ a device such as shown in Figs. 23 and 24. This device comprises a system of tapes arranged to travel in the same direction as the bag lengths and closely adjacent thereto. The speed of the tapes preferably is greater than the normal speed of the bag lengths, whereby the latter are assisted in their progress through the machine rather than retarded as in the case of stationary guides.

Across the frame structure of the machine above the transfer rolls is mounted a cross plate 178. A vertical frame structure 179 extends upwardly from this plate. Through vertical slots 180 in each side of the frame structure 179 is mounted a shaft 181 to each end of which is keyed a rack gear 182. These rack gears mesh with rack bars 183 on the frame structure 179, and permit the shaft 181 to be raised and lowered by manipulation of hand wheel 184. The normal tendency of the shaft 181 is to fall by gravity to the bottom of slots 180. Above the upper end of slots 180 are mounted a front shaft 185 and a rear shaft 186, these shafts being rotatably mounted in the frame structure 179. Below the lower end of slots 180 are mounted two similar rotatable rolls 187 and 188, the former being on the front side of the slots and the latter being on the rear side of the slots. On the front side of the frame structure 179 is mounted a rotatable shaft 189.

Extending transversely of the frame 13 and in advance of the idler rolls 97 and 98 is a rotatable shaft 190 having tape guides 191. The tape guides are positioned between the idler rolls 97 and their bottom portion is slightly higher than the bottom portion of the rolls 97. A shaft 192 is rotatably mounted in the frame structure 109 of the bottom-forming unit and has tape guides 193 positioned slightly above the plate 108.

Two rotatable shafts 194 and 195 are mounted in the sides of the frame structure 13 between the idler rolls 97 and the transfer rolls 101 and slightly above the level of the bottom portions of the latter. Continuous tapes 196 pass about shafts 191 and 192, beneath shaft 195, over the top of shaft 187, beneath shaft 188, about upper shaft 186, beneath the floating shaft 181, over upper shaft 185, behind shaft 189, beneath shaft 194 and thence to shaft 191. In passing beneath shafts 191 and 192 the tapes form a guide which prevents bag lengths from being filled with air and expanding as they travel between the idler rolls and the bottom-forming rolls.

When it is desired to produce bags of greater length than the length for which the machine is set, the bottom-forming unit is moved backwardly as described heretofore. This movement causes shaft 192 to be drawn away from the shaft 191. To provide the extra length of tape for this movement, the shaft 181 is rotated in such a manner as to cause it to be raised in the slots 180. If it is desired to lock the shaft in this position, nuts 197 are tightened.

The tapes 196 are driven by rotation of shaft 192, this shaft carrying a gear 198 which meshes with an idler gear 199 driven by gear 154 on shaft 118 of the top roll 117.

In Figs. 20, 21, and 22 is shown a modified form of cutting roll which has been found particularly satisfactory. The roll 200 shown in the drawings extends substantially the length of the shaft 84 upon which it is mounted and is provided with a cut-out portion of substantial length. In this cut-out portion is mounted a base plate 201 having a series of threaded openings 202 along its length. The base plate is fastened in place by means of bolts 203 which are screwed into rolls 200.

Knife sections 204 of any desired width may be mounted in the cutting roll by means of screws 205 which are engaged at proper points with the threaded holes 202. Rubber layers 206 are adhesively secured to the outer face of the knife sections.

In this manner adjustment of the machine for bags of different width is effected easily and without changing the cutting rolls. It is preferred to cast the knife sections 204 about the knife blade 207 in order to provide a firm engagement, a suitable alloy such as babbitt being employed as the material for the knife sections.

The various modifications of the hereindescribed structure coming within the spirit of my invention are intended to be included in the appended claims.

I claim:

1. In a device of the character described, means for progressing a continuous web, means for folding over and adhesively securing together the free edges of said progressing web to form a tube, a smooth cutting shoe reciprocably mounted within said tube, cutting rolls mounted above and below said shoe and having smooth knives positioned to score-cut against said shoe.

2. In a device of the character described, a smooth faced cutting shoe, a cutting roll adjacent said shoe and carrying a smooth knife adapted to rotate against said shoe upon rotation of said roll, and means for preventing relative motion between said roll and said shoe when said knife is against the latter.

3. In a device for cutting cellulose sheeting, a smooth faced cutting shoe, a cutting roll carrying a curved cutting knife, said roll being positioned adjacent said shoe, whereby said knife rotates against said shoe upon rotation of said roll to produce a score-cut in the cellulose sheeting.

4. In a device of the type described, a tube-forming mechanism, a smooth faced cutting shoe adapted to reciprocate in the tube formed by said mechanism, a cutting roll adjacent said shoe and having a knife adapted to roll against said shoe upon rotation of said roll, a drive means for imparting reciprocal motion to said shoe, a resilient connection between said shoe and said drive, and means on said cutting roll for preventing relative motion between said shoe and said knife during contact of said knife with said shoe.

5. In a device of the type described, a tube-forming mechanism, a cutting shoe adapted to reciprocate in the tube formed by said mechanism, a cutting roll adjacent said shoe and having a knife adapted to cooperate with said shoe to cut said tube upon rotation of said roll, drive means for reciprocating said shoe from a position of rest on one side of said roll to a position of rest on the other side of said shoe, a resilient connection between said shoe and said drive means, and means on said roll for preventing relative motion between said shoe and said knife during the cutting operation.

6. In a device of the type described, a base frame, a tube-forming mechanism, a traveling mandrel mounted on said mechanism and having a cutting shoe reciprocable in the tube formed thereby, draw rolls adjustable longitudinally of said base frame for progressing the tube formed by said mechanism, said mechanism being movable longitudinally of said base frame with said draw rolls, a drive mechanism independent of said movable tube-forming mechanism for reciprocating said mandrel, cutting rolls above and below said tube and carrying knife blades operable in connection with said cutting shoe for partially severing bag lengths from said tube, transfer rolls for tearing the partially severed bag length from the tube, and a bottom-forming device for forming the bag length into a completed bag.

7. In a device of the type described, a tube-forming mechanism including a plate about which a continuous web is folded, a traveling mandrel mounted adjacent said plate and having a cutting shoe reciprocable in the tube formed by said mechanism, cutting rollers having knives cooperable with said shoe to cut said tube, means for adjusting the distance between said tube-forming mechanism and the cutting rolls, and means independent of said adjusting means for reciprocating said traveling mandrel.

8. In a device of the type described, a tube-forming mechanism, a traveling mandrel having a cutting shoe reciprocable in the tube formed by said mechanism, cutting rolls having curved knives cooperable with said shoe for cutting said tube, a rotatable disk having a diametric slot radially disposed with respect to said knives, a post adjustably mounted in said slot, a rod rotatably mounted to said post, a lever resiliently connected to the other end of said rod, means operable by said lever for reciprocating said shoe between said cutting rolls, and means for maintaining the speed of said shoe equal to the speed of said knives during the cutting operation.

9. In a device of the character described, a bellows tube-forming mechanism including a lower plate and an upper plate spaced from said lower plate by two spaced bars, a traveling mandrel reciprocably positioned between said spaced bars, adjacent channels in said bars and said mandrel, and a series of balls in said channels for supporting said mandrel and forming bearing surfaces therefor.

10. In a device of the type described, a tube-forming mechanism including a plate about which a continuous web is folded, spaced bars adjacent said plate, a traveling mandrel reciprocably positioned between said spaced bars, adjacent channels in said bars and said mandrel, and a series of balls in said channels for supporting said mandrel and forming bearing surfaces therefor.

11. In a device of the type described, a base frame, separate frame units mounted on said base frame and movable longitudinally thereof, a table portion having one end rigidly supported by said frame units and movable therewith, means for supporting the opposite end of said table portion, an arch on said opposite end of the table portion, a vertical rod adjustably supported by said arch and extending adjacent said table, and a tube-forming mechanism suspended by said vertical rod and extending longitudinally of said table.

12. In a device of the type described, a base frame, draw roll frame units mounted on said base frame and movable longitudinally thereof, draw rolls rotatably mounted in said frame units, a table portion having one end rigidly supported by said frame units and movable therewith, an arch on the opposite end of the table portion, a vertical rod adjustably supported by said arch and extending adjacent said table, a tube-forming mechanism rigidly suspended by said vertical rod and extending longitudinally of and being spaced from said table portion, a traveling mandrel reciprocably mounted on said tube-forming mechanism, and means unaffected by movement of said draw roll frame units for imparting reciprocal motion to said traveling mandrel.

13. In a device of the type described, a tube-forming mechanism, a traveling mandrel having a smooth cutting shoe reciprocable in the tube formed by said mechanism, cutting rolls mounted above and below said shoe and spaced therefrom, and smooth knives on said rolls adapted to roll against said shoe to score-cut said tube.

14. In a device of the type described, a tube-forming mechanism, a traveling mandrel having a smooth shoe reciprocable within the tube formed by said mechanism, cutting rolls mounted above and below said shoe and spaced therefrom, smooth knives on said rolls adapted to roll against said shoe to score-cut said tube, resilient drive means for reciprocating said shoe, and layers of rubber secured to said cutting rolls about said knives for gripping said shoe through said tube and maintaining the speed thereof equal to the speed of the cutting knives.

15. In a device of the type described, a reciprocable smooth cutting shoe, a cutting roll adjacent said shoe, and a smooth knife on said roll adapted to roll against said shoe, said knife having the shape of a main curve terminated at each end by a reverse curve.

16. In a device of the type described, horizontally spaced tape rolls positioned adjacent the path of travel of an open ended tube section, upper tape rolls, continuous tapes about said rolls, and a regulating roll suspended by said tapes between said upper rolls.

17. In a device of the type described, a tube-cutting mechanism, a bottom forming device movable toward and away from said mechanism, a tape roll adjacent the path of travel of tube lengths passing between said mechanism and said device and movable with said device, a second tape roll adjacent said mechanism, upper tape rolls, continuous tapes about said rolls, and an adjustable regulating roll for varying the effective length of said tapes in accordance with the position of said device.

18. A bag making machine comprising in combination a cut-off plate having plane faces and extending lengthwise of the machine, tubing mechanism for tubing the material of the bag about said cut-off plate, a pair of rollers, cutters carried thereby, said cutters rolling in contact with the plane faces of said plate intermittently to cut through the upper and lower walls of the tubing on said plate at bag length intervals partially to divide the tubing into bag lengths by a pinch cut.

19. A bag making machine comprising in combination a cut-off plate having plane faces and extending lengthwise of the machine, tubing mechanism for tubing the material of the bag about said plate, forwarding rollers for advancing the tubing along said plate, a pair of rollers in the path of said tubing, a cutter carried by each roller, said cutters rolling over the plane faces of said plate in contact with the tubing thereon to cut through the upper and lower walls of the tubing with a pinch cut partially to divide the tubing into bag lengths.

20. A bag machine, comprising in combination a cut-off plate having plane faces and extending lengthwise of the machine, said cut-off plate being adapted to receive a tube of bag material thereabout, a pair of rollers, and cutters carried thereby, said cutters rolling in contact with the plane faces of said plate intermittently to cut through the upper and lower walls of the tubing on said plate at bag length intervals partially to divide the tubing into bag lengths by a pinch cut.

21. In a bag machine, a reciprocable smooth cutting shoe, means for progressing a tube of bag material lengthwise of and about said shoe, a smooth edged cutting knive mounted adjacent said shoe, said cutting knive being formed in curved shape, and means for rotating said curved knife substantially in surface contact with said shoe at cutting intervals to produce a score cut in said tube.

22. In a bag machine, a reciprocable smooth cutting shoe, means for progressing a tube of bag material lengthwise of and about said shoe, cutting rolls rotatably mounted on opposite sides of said cutting shoe, and curved cutting knives carried by said rolls, the cutting edges of said knives being substantially equidistant from the rotation center of said rolls at all points and being positioned to roll substantially in surface contact with said shoe during cutting intervals to produce score cuts in said tube.

23. A bag making machine comprising in combination a smooth-faced metal cut-off plate, means for tubing the bag making material about said plate, means for continuously advancing the tubing, rollers in the path of the advancing tubing, a cutter carried by each roller adapted to roll over the smooth faces of the said plate partially to divide the tubing thereon into bag lengths with a pinch cut, overspeeded forwarding rollers adapted to engage the tubing during said dividing operation, and a second pair of rollers in the path of the tubing and traveling at a higher peripheral speed than said overspeed rollers, the last mentioned rollers engaging the partially divided tubing to exert a pull on the tubing in the direction of its length to complete the dividing operation.

24. A machine of the type described, comprising a tube forming mechanism including a reciprocating smooth cut off plate extending longitudinally of the machine and interiorly positioned with respect to the tube formed by said mechanism, a smooth edged cutter mounted on each side of said plate, and means for intermittently producing a cutting contact between said cutters and said plate.

25. A machine of the type described, comprising a reciprocable smooth cutting shoe, means for progressing a tube of material lengthwise of and about said shoe, a smooth edged cutting knife mounted adjacent said shoe, and means for rotating said knife substantially in surface contact with said shoe at intervals to produce a score cut in each tube.

26. A machine of the type described, comprising a cutting plate having plane faces extending lengthwise of the machine, tubing mechanism for tubing material to be cut about said plate, smooth edged cutters mounted on opposite sides of said plate, and means for rotating said cutters in contact with the plane faces of said cutting plate intermittently to produce simultaneous pinch cuts through the upper and lower walls of the tubing.

27. A device of the type described, comprising a cutting shoe having a smooth face extending lengthwise of the device, a smooth cutting knife mounted adjacent said shoe, means for forming a tube of material about said shoe, means for progressing said tube through the device, means for reciprocating said shoe within said tube to provide intermittent substantially equal forward motion therewith, and means for moving said knife into cutting contact with said shoe at substantially the same speed of said shoe during said substantially equal forward motion to produce a smooth cut in said tube.

28. A device of the type described, comprising a cutting shoe having smooth faces extending lengthwise of said device, smooth cutting knives mounted on opposite sides of said shoe, means for forming a tube of material about said shoe, means for intermittently producing cutting contact between said shoe and said knives and for moving said shoe and said knives at substantially the same rate as said tube during the period of the cutting contact.

WILLIAM H. ENGEL.